United States Patent [19]

Song et al.

[11] Patent Number: 4,831,435
[45] Date of Patent: May 16, 1989

[54] ADAPTIVE SCANNING LINE CONVERTING CIRCUIT FOR A TELEVISION RECEIVER

[75] Inventors: Dong-Il Song; Chul-Jin Kim; Byung-Min Min, all of Suweon, Rep. of Korea

[73] Assignee: Samsung Electronics Co., Ltd., Suweon City, Rep. of Korea

[21] Appl. No.: 126,114

[22] Filed: Nov. 27, 1987

[30] Foreign Application Priority Data

Nov. 29, 1986 [KR] Rep. of Korea .......... 1986-10183[U]

[51] Int. Cl.$^4$ .......... H04N 7/01; H04N 5/14; H04N 5/21
[52] U.S. Cl. .......... 358/140; 358/167; 358/160
[58] Field of Search .......... 358/166, 167, 140, 133, 358/138, 160

[56] References Cited

U.S. PATENT DOCUMENTS

| | | | |
|---|---|---|---|
| 4,240,113 | 12/1980 | Michael et al. | 358/105 |
| 4,551,753 | 11/1985 | Nishiyawa et al. | 358/140 |
| 4,609,941 | 9/1986 | Carr et al. | 358/140 |
| 4,677,476 | 6/1987 | Kondo | 358/105 |
| 4,684,985 | 8/1987 | Nakajaki et al. | 358/140 |
| 4,730,217 | 3/1988 | Tonge et al. | 358/140 |
| 4,740,842 | 4/1988 | Amegarn et al. | 358/167 |

*Primary Examiner*—James J. Groody
*Assistant Examiner*—John K. Peng
*Attorney, Agent, or Firm*—Robert E. Bushnell

[57] ABSTRACT

A circuit and technique for using only a line memory that has small capacity and selecting a proper interpolation filter according to the correlationship of vertical and slanting directions between two scanning lines of input signals. This system performs the steps of applying interlaced scanning signals to an image signal delaying circuit having delaying elements, generating a plurality of signals according to each delay, filtering in a two dimensional space filter, detecting the correlationship of the vertical and slanting directions between the lines by logic operations of the delay signal, selecting a proper space filter of the two dimensional space filter in response to the detected signal and converting in time axis with the interlaced scanning signals and a signal properly generated through the interpolation filter of a filter selector, thereby economically obtaining a high quality picture image.

31 Claims, 2 Drawing Sheets

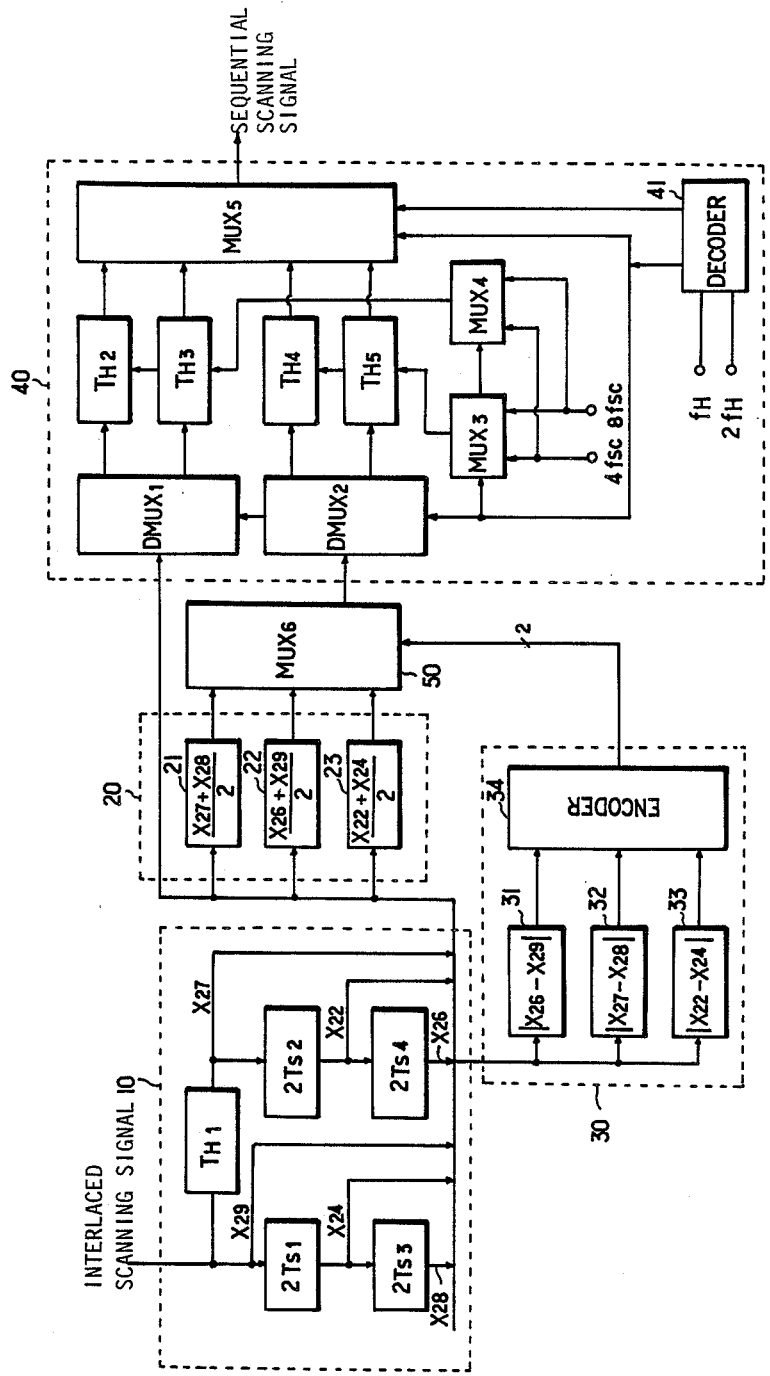
F I G. 2

ADAPTIVE SCANNING LINE CONVERTING CIRCUIT FOR A TELEVISION RECEIVER

TECHNICAL FIELD

The present invention relates to providing the scan line converting circuit in a television receiver, and more particularly to providing a technique and an adaptive scan line converting circuit utilizing horizontal and vertical correlationship in the television receiver which is economical and can obtain a high quality picture by selecting the proper interpolating filter depending upon the correlationship of the vertical and slanting direction between two lines, utilizing only line memory.

BACKGROUND ART

Generally, the integration technique of the integrated circuit has developed rapidly and it enabled the digital signal process, thereby giving competitiveness to the digital television receiver. Therefore, various signal processing impossible in the analog signal processing systems is newly becoming possible, but the recent NTSC broadcasting system, which adapts the interlacing scan type of 2 to 1, generates flicker at the frame frequency rates due to the luminance changes of adjacent scan lines, and causes vertical movement to be viewed differently at each field. For these reasons, the coarse scan line structure is formed, the flight of the scan line toward the vertical is disturbed by the line crawl during its flight, and the vertical resolution is reduced by the interlacing scan, thereby lowering the picture quality. Thus, the conventional technique for compensating the lowering of picture quality as described above has used a method of constituting the timing/spacing filter of the three dimensions utilizing the frame memory, but it requires a large capacity memory and has many unreasonable problems in the popularization from the economical viewpoint. Also a method of changing to sequential scan by using only line memory was put to the practical use, but had many problems hindering improvement of the picture quality when considering the picture quality.

STATEMENT OF THE INVENTION

Accordingly, the main object of the present invention is to provide an improved sequential scan converting method and circuit. It is another object to provide a circuit of the sequential scan converting method that provides high quality picture economically by selecting the proper interpolation filter according to the correlationship of the vertical and slanting direction between two scan lines of the input signal using only line memory. In order to perform the objects of the present invention, the present invention contemplates a circuit configuration for performing the method including the steps of applying the interlacing signal to the image signal delaying portion provided with delay elements to output various delay signals by each delay element, and to force said output signals to filter in the two dimensional spacing filter, and operating logically said output signal of said image signal delay portion to generate a detection signal on the basis of the correlationship of the vertical and slanting directions between the lines, and selecting the proper spacing filter in the two dimensional spacing filter responsive to said detection signal, and converting the timing axis by said input interlacing scan signal and the signal generated through the appropriate interpolation filter during the correlationship detecting, thereby obtaining an image of a high quality picture economically.

BRIEF DESCRIPTION OF THE DRAWINGS

These and other objects and advantages of the present invention will become clear from the following description with reference to the accompanying drawings, wherein:

FIG. 2 is a schematic circuit of FIG. 1 in accordance with the present invention.

DETAILED DESCRIPTION OF THE INVENTION

Figure 1:
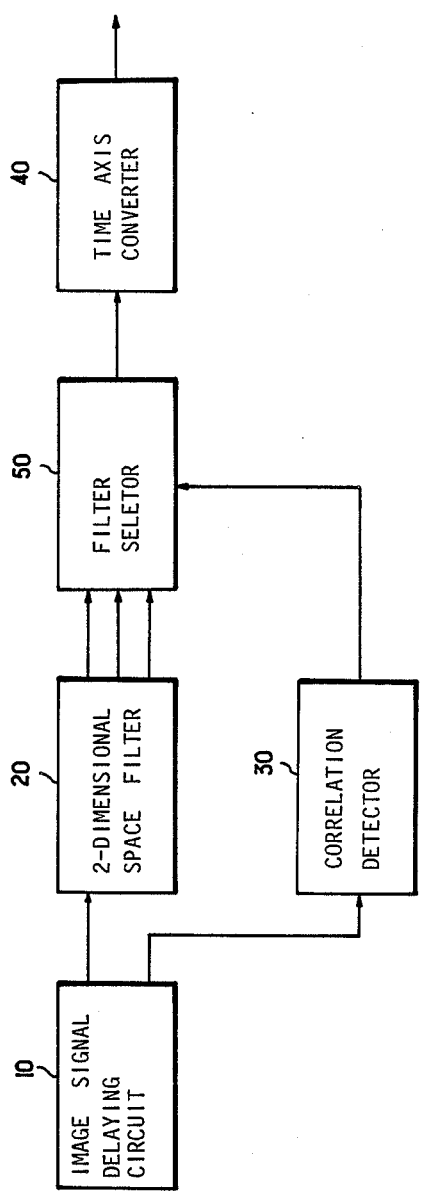
FIG. 1 is a block diagram in accordance with the present invention.

Referring to FIG. 1, the present invention includes image signal delaying circuit 10 for applying an interlacing scan signal to the circuit provided with delay elements and generating various delay signals from each delay element, two-dimensional filter 20 for filtering various signals from said image signal delaying circuit 10, correlationship detector 30 for logically operating upon the signal from said image signal delaying circuit 10 to detect the correlationship of the vertical and slanting direction between lines and selecting a signal from one of individual filters 21, 22, 23 of two-dimensional space filter 20 in response to said detecting signal, timing axis converter 40 for converting the timing axis by said input interlacing scan signal and the signal properly generated through the interpolation filter 20 and filter selector 50 for selecting one filter of spacing filters 21, 22, 23 in said two-dimensional space filter 20 by the output signal of said correlationship detector 30.

The above embodiment according to the configuration of the present invention is described as follows. When the interlacing scan signal is input into image signal delaying circuit 10, image signal delaying circuit 10 outputs various signals delayed through the line memories and the pixels, two-dimensional space filter 20 filters said delayed signals from said delaying circuit 10, correlationship detector 30 selects the interpolation filter 21, 22, 23 suitable to its input based on the detected correlationship therein, and filter selector 50 selects the space filter of two-dimensional space filter 20, then the filtering signal of said space filter 20 selected by filter selector 50 is input to timing axis converter 40 to allow said to convert portion converting the timing axis by utilizing the interpolation signal and the interlacing scan signal, thereby obtaining the image of the high quality picture economically.

Refering to FIG. 2, image signal delaying circuit 10 comprises at least one delaying element in which input interlacing scan signal is assumed to be X29, and when this signal passes through delaying element TH1, X27 is output, X29 forces delaying element 2Ts1 to output the signal of X24, said signal X24 is passed through delaying element 2Ts3 to be output as the signal of X28. Said signal X27 is passed through delaying element 2Ts2 to be output as the signal of X22, and said signal X22 is output as the signal of X26 by delaying element 2Ts4.

Two-dimensional space filter 20 is provided with first space filter 21 for filtering at least one signal selected among the signals of X22, X24, X26, X27, X28, and X29 and generating the signal of $$\frac{X27 + X28}{2},$$

second space filter 22 for generating the signal of $$\frac{X26 + X29}{2}$$

by its filtering operation and third space filter 23 for generating the signal of $$\frac{X22 + X24}{2}$$

by its filtering action. Correlation detector 30 includes first, second and third absolute operating means for logically operating at least one signal selected among the signals of X22, X24, X26, X27, X28, and X29, and the encoder, in which first absolute operating means 31 generates the signal having the value of $|X26-X29|$, second absolute operating means 32 produces the signal having the value of $|X27-X28|$, third absolute operating means 33 produces the signal having the value of $|X22-X24|$ and encoder 34 encodes the outputs from first, second and third absolute operating means 32,32,33.

Filter selector 50 is provided with multiplexer MUX6 for selectively generating the output of first, second and third spacing filter 21,22,23 responsive to the correlation detecting outputs.

Timing axis converter 40 is so constructed that demultiplexer DMUX1 receives the output X24 of image signal delaying circuit 10 and demultiplexer DMUX2 receives the output of multiplexer MUX6 in filter selector 50 to generate their output responsive to decoder 41, demultiplexer DMUX1 is connected to delaying element TH2, TH3, demultiplexer DMUX2 is coupled to delaying elements TH4, TH5 and decoder 41 is coupled to multiplexer MUX3, MUX4 to control delay elements TH2-TH5 by their outputs, and demultiplexer MUX5 receives all the outputs of delaying element TH2-TH5 to selectively output the sequential scan signal according to the control of decoder 41.

Thus, a preferred embodiment of the present invention will be described as follows.

The interlacing scan signal delaying circuit 10 is input to the input end of image signal delaying circuit 10 to generate the signal of X29 at it's output. Therefore this signal X29 is applied to delaying element TH1 that is the line memory, to obtain the signal X27, said signal X29 is applied to delaying element 2Ts1, that is, pixel memory to obtain the signal of X24, said signal X27 is applied to delaying element 2Ts2 to obtain the signal of X22, and said signal X22 is applied to delaying element 2Ts4 to obtain the signal of X26.

Then, the first absolute value operating means 31 and the second alsolute operating means 32 in correlationship detector 30 select at least the signal among the signals X29, X24, X28, X27, X22, X26 obtained respectively by said delaying circuit 10 and said delaying elements to operate upon them and output the signal of $|X26-X29|$ and the signal of $|X27-X28|$ respectively, thereby detecting the correlationship of the slanting direction and similarly third to alsolute value operating means 33 operates the value of the signal of $|X22-X24|$, thereby detecting the correlationship of the vertical direction.

If the correlationship of the slanting direction X26, X29 is the greatest among the others, multiplexer MUX6 selects the value of $$\frac{X26 + X29}{2}$$

operated upon by second spacing filter 22 in two-dimensional space filtering portion 20 as the interpolation filter signal in response to the output of encoder 34. If the correlationship of the vertical direction X24, X22 is the greatest among the others, multiplexer MUX6 selects the value of $$\frac{X24 + X22}{2}$$

operated by third spacing filter 23 in a two-dimensional space filter 20 as the interpolation filter signal in response to the output of encoder 34. When the correlationship of the slanting direction X27, X28 is the greatest among others, multiplexer MUX6 selects the value of $$\frac{X27 + X28}{2}$$

obtained by first spacing filter 21, as the interpolation filter signal from two-dimensional space filter 20 in response to the output of encoder 34.

On the other hand, in converter 40 demultiplexer DMUX1, DMUX2 respective receive the output signal X24 from image signal delaying circuit 10 and the output signal selected by multiplexer MUX6. Said signals are selectively input to delaying elements TH2-TH5 by controlling demultiplexers DMUX1, DMUX2 in response to the signal generated from the output of decoder 41 to which horizontal scanning frequencies fH, 2fH are applied.

At this time, multiplexer MUX3, MUX4 is controlled according to the signal of color subcarrier frequencies 4 fsc, 8 fsc to write at the rate of 4 fsc of the selected signal and to read sequentially at the rate of 8 fsc of the selected signal during the following line (scan) period, thereby converting them into a sequential scan signal.

As described above, the prsent invention has the advantage of providing a sequential scan method that can econimically provide high quality picture by selecting the interpolation filter according to the correlationship of the vertical and slanting directions between two lines of the input signal utilizing the line memory.

What is claimed is:

1. An adaptive scanning line converting circuit using horizontal and vertical correlations in a television receiver, said circuit comprising:

an image signal delaying circuit including a plurality of delaying elements receiving an interlacing scan signal and providing various can and delayed signals;

filter means including a plurality of interpolation filter elements, for filtering said various signals from said image signal delaying circuit;

detector means for detecting correlation in vertical and slanting directions between lines by performing operations upon said various signals from said delaying circuit;

time axis converter means for converting a timing axis on the basis of one of the delayed signals and signals obtained through said interpolation filter elements; and filter selector means for selecting signals from any one of said interpolation filter elements from among the interpolation filter elements of said filter means in response to the correlation detected by said correlation detector.

2. The circuit of claim 1, wherein said delaying circuit requires only line memory.

3. The circuit of claim 1, wherein:

each of said filter elements operates upon a plurality of different ones of said various signals; and said detector means detects said correlation by operating upon each of said pluralities of different ones of said various signals.

4. The circuit of claim 1, wherein:

each of said filter elements operates upon a plurality of different ones of said various signals; and said detector means detects said correlation by obtaining an absolute value difference for each of said pluralities of different ones of said varous signals.

5. The circuit of claim 1, wherein:

each of said filter elements operates upon a plurality of different ones of said various signals with said various signals in a first of said pluralities of different ones describing a vertical direction between scanning lines and with said various signals in a second of said pluralities of different ones describing a slanting direction between scanning lines; and said detector means detects said correlation by obtaining an absolute value difference for each of said pluralities of different ones of said various signals.

6. The circuit of claim 2, wherein:

each of said filter elements operates upon a plurality of different ones of said various signals with two of said various signals in each of said plurality of different ones describing a vertical and slanting direction between scanning lines; and said detector means detects said correlation by obtaining an absolute value difference for each of said pluralities of different ones of said various signals.

7. The circuit of claim 1, wherein said selector means selects one of said filter elements on a basis of relative magnitudes between a plurality of absolute values of differences between selected pairs of said various signals.

8. The circuit of claim 5, wherein said selector means selects said one of said filter elements on a basis off relative magnitudes between each absolute value difference.

9. The circuit of claim 5, wherein said selector means determines which of said absolute value differences satisfies an established condition and selects one of said filter elements operating upon the same plurality of said different ones of various signals as corresponds to said absolute value difference satisfying said condition.

10. The circuit of claim 1, wherein said plurality of delaying elementes of said delaying circuit comprise:

a first plurality of serially arranged pixel memories receiving said interlacing scan signal to said converter means, filter means and detector means, and providing a first one of said delayed signals to said filter means and detector means;

a second plurality of serially arranged pixel memories providing others of said delayed signals to said filter means and detector means; and a single line memory interposed between said first and second pluralities of pixel memories, receiving said interlacing scan signals and providing a sole other one of said delayed signals to said second plurality of pixel memories, filter means and detector means.

11. An adaptive scanning line converting circuit, comprising:

delaying means for receiving interlaced scan signals and generating a plurality of various scan and delayed signals;

filter means for filtering said various signals obtained from said delaying means to provide a plurality of filter signals;

detector means for determining correlation in vertical and slanting directions between pairs of scanning lines of said scan signals by operating upon pluralities of different ones of said various signals;

means for selecting one of said filtered signals from said filter means on the basis of said correlation; and means for converting a timing axis on the basis of a first one of said plurality of delayed signals and said filtered signals selected by said selecting means.

12. The circuit of claim 11, wherein:

said filter means comprises a plurality of filter elements with each of said filter elements operating upon a different plurality of said different ones of said various signals and with said various signals in a first of said pluralities of different ones describing a vertical direction between scanning lines and with said various signals in a second of said pluralities of different ones describing a slanting direction between scanning lines; and said detector means detects said correlation by obtaining an absolute value difference for each of said pluralities of different ones of said various signals.

13. The circuit of claim 11, wherein said selector means selects one of said filter signals on a basis of relative magnitudes between a plurality of absolute values of differences between selected pairs of said scan and delayed signals.

14. The circuit of claim 12, wherein said selector means selects said one of said filter signals on a basis of relative magnitudes between each absolute value difference.

15. The circuit of claim 12, wherein said selector means determines which of said absolute value differences satisfies an established condition and selects said one of said filtered signals from one of said filter elements operating upon the same plurality of said different ones of said various signals as correspond to said absolute value difference satisfying said condition.

16. The circuit of claim 11, wherein said delaying circuit comprises:

a first plurality of serially arranged pixel memories receiving said interlaced scan signals and providing said first one of said delayed signals to said converting means, filter means and detector means, and providing another of said delayed signals to said filter means and detector means;

a second plurality of serially arranged pixel memories providing others of said delayed signals to said filter means and detector means; and a single line memory interposed between said first and second pluralities of pixel memories, receiving said interlaced scan signals and providing a sole other one of said delayed signals to said second plurality of pixel memories, filter means and detector means.

17. An adaptive scanning line converting circuit, comprising:
  delaying means for receiving interlaced scan signals and generating a plurality of various scan and delayed signals;
  filter means for operating upon each of different pluralities of said various signals to provide a plurality of filtered signals with each of said filtered signals corresponding to a different one of said different pluralities;
  detector means for determining correlation in vertical and scanning directions between pairs of scanning lines of said scan signal by obtaining absolute value differences for each of said different pluralities of said various signals;
  selecting means for responding to one of said absolute value differences satisfying an established condition to select one of said filtered signals corresponding to the same plurality of said different ones of said various signals as provide said absolute value difference satisfying said condition; and
  means for converting a timing axis to generate a sequentially scanned signal on the basis of a first one of said plurality of said various signals and said filtered signals selected by said selecting means.

18. The circuit of claim 17, wherein said selector means selects said one of said filter elements on a basis of relative magnitudes of said absolute value differences.

19. The circuit of claim 17, wherein said delaying means comprises:
  a first plurality of serially arranged pixel memories receiving said interlaced scan signals and providing said first one of said delayed signals to said converting means, filter means and detector means, and another of said delayed signals to said filter means and detector means;
  a second plurality of serially arranged pixel memories providing others of said delayed signals to said filter means and detector means; and
  a single line memory interposed between said first and second pluralities of pixel memories, receiving said interlaced scan signals and providing a sole other one of said delayed signals to said second plurality of pixel memories, filter means and detector means.

20. An adaptive scanning line converting circuit, comprising:
  delaying means for receiving interlaced scan signals and generating a plurality of various scan and delayed signals including a multiplicity of different pluralities of various said scan and delayed signals with different ones of said different pluralities characterizing slanting and vertical directions between scanning lines of said interlaced scan signals;
  filter means for filtering said different pluralities of said various signals to provide a plurality of filtered signals each corresponding to different ones of said different pluralities;
  detector means for determining correlation in said vertical direction by operating on a first plurality of said different pluralities, and for determining correlation in said slanting direction by operating on a second of said different pluralities;
  means for selecting one of said filtered signals from said filter means on the basis of a comparison of said correlations; and
  means for converting a timing axis on the basis of a first one of said plurality of delayed signals and said filtered signals selected by said selecting means.

21. The circuit of claim 20, wherein said filter means comprises a plurality of filter elements with each of said filter elements filtering different pluralities of said various signals with said various signals in said first plurality characterizing a vertical direction between scanning lines and with said various signals in said second plurality characterizing a slanting direction between scanning lines; and
  said detector means detects said correlation by obtaining an absolute value difference for each of said pluralities of different ones of said various signals.

22. The circuit of claim 20, wherein said selector means selects one of said filtered signals on a basis of relative magnitudes between a plurality of absolute values of differences between said various signals of said different pluralities.

23. The circuit of claim 21, wherein said selector means elects said one of said filtered signals on a basis of relative magnitudes between absolute value differences between said various signals of said different pluralities.

24. The circuit of claim 21, wherein said selector means determines which of said absolute value differences satisfy an established condition and selects one of said filtered signals corresponding to the same plurality of said different ones of said various signals as correspond to said absolute value difference satisfying said condition.

25. The circuit of claim 20, wherein said delaying circuit comprises:
  a first plurality of serially arranged pixel memories receiving said interlaced scan signals and providing said first one of said delayed signals to said converting means, filter means and detector means, and providing another of said delayed signals to said filter means and detector means;
  a second plurality of serially arranged pixel memories providing others of said delayed signals to said filter means and detector means; and
  a single line memory interposed between said first and second pluralities of pixel memories, receiving said interlaced scan signals and providing a sole other one of said delayed signals to said second plurality of pixel memories, filter means and detector means.

26. An adaptive scanning line converting circuit, comprising:
  a first plurality of serially arranged pixel memories receiving interlaced scan signals and providing one of a plurality of delayed signals and providing another of said delayed signals;
  a second plurality of serially arranged pixel memories providing others of said delayed signals;
  a single line memory interposed between said first and second pluralities of pixel memories, receiving said interlaced scan signals and providing a sole other one of said delayed signals to said second plurality of pixel memories;
  detector means including a plurality of detector elements each receiving different pluralities of different ones of various said scan and delayed signals with said various signals in different ones of said different pluralities describing vertical and slanting directions between scanning lines of said scan signals, and a first of said detector elements receiving said sole other one of said delayed signals and said another one of said delayed signals, a second of said detector elements receiving one of said others of said delayed signals and one of said scan signals, and a third of said detector elements receiving said delayed signals and one of said others of said delayed signals, for determining correlation in vertical and slanting directions between pairs of scanning lines with each of said detector elements obtaining an absolute value differences for each of said different pluralities of various signals;

filter means for filtering said different pluralities of different ones of said various signals to provide a plurality of filtered signals each corresponding to different ones of said different pluralities;

selecting means for responding to one of said absolute value differences satisfying an established condition to select one of said filtered signals corresponding to the same plurality of said different ones of said various signals as provide said absolute value difference satisfying said condition; and means for converting a timing axis to generate a sequentially scanned signal on the basis of said one of said plurality of delayed signals and said filtered signals selected by said selecting means.

27. An adaptive scanning line converting process, comprising:
receiving interlaced scan signals, and using a single line memory and a plurality of pixel memories to selectively delay said scan signals and generate a plurality of delayed signals;
filtering different pluralities of different ones of said scan and delayed signals to provide a plurality of filtered signals;
detecting correlations of slanting and vertical directions between scanning lines of said scan signals by obtaining absolute value differences for each of said different pluralities of said scan and delayed signals;
responding to one of said absolute value differences satisfying an established condition by selecting one of said filtered signals corresponding to the same plurality of said different ones of said various signals as provide said one of said absolute value differences satisfying said condition; and
converting a timing axis to generate a sequentially scanned signal on the basis of a first one of said plurality of delayed signals and said filtered signals selected by said selecting means.

28. The process of claim 27, wherein said steps of receiving interlaced scan signals, using a line memory and a plurality of pixel memories comprises:
receiving said interlacing scan signal and generating said first one of said delayed signals from said interlacing scan signal;
generating a second one of said delayed signals from said first one of said delayed signals;
delaying a line of said interlacing scan signal to generate a single one of said delayed signals; and
generating all others of said delayed signals from said single one of said delayed signals.

29. The process of claim 28, wherein said step of filtering comprises:
filtering a signal formed by said single one of said delayed signals and said second one of said delayed signals;
filtering a signal formed by one of said others of said delayed signals and one of said scan signals; and
filtering said first one of said delayed signals and another of said others of said delayed signals.

30. The process of claim 28, wherein said detecting step comprises:
determining correlation of a signal formed by said single one of said delayed signals and said second one of said delayed signals;
determining correlation of a signal formed by one of said others of said delayed signals and one of said scan signals; and
determining correlation of a signal formed by said first one of said delayed signals and another of said others of said delayed signals.

31. The process of claim 29, wherein said detecting step comprises:
determining correlation of a signal formed by said single one of said delayed signals and said second one of said delayed signals;
determining correlation of a signal formed by one of said others of said delayed signals and one of said scan signals; and
determining correlation of a signal formed by said first one of said delayed signals and another of said others of delayed signals.

* * * * *